No. 757,288. PATENTED APR. 12, 1904.
W. S. EMERT.
DRAFT EQUALIZER.
APPLICATION FILED FEB. 6, 1904.
NO MODEL. 2 SHEETS—SHEET 2.
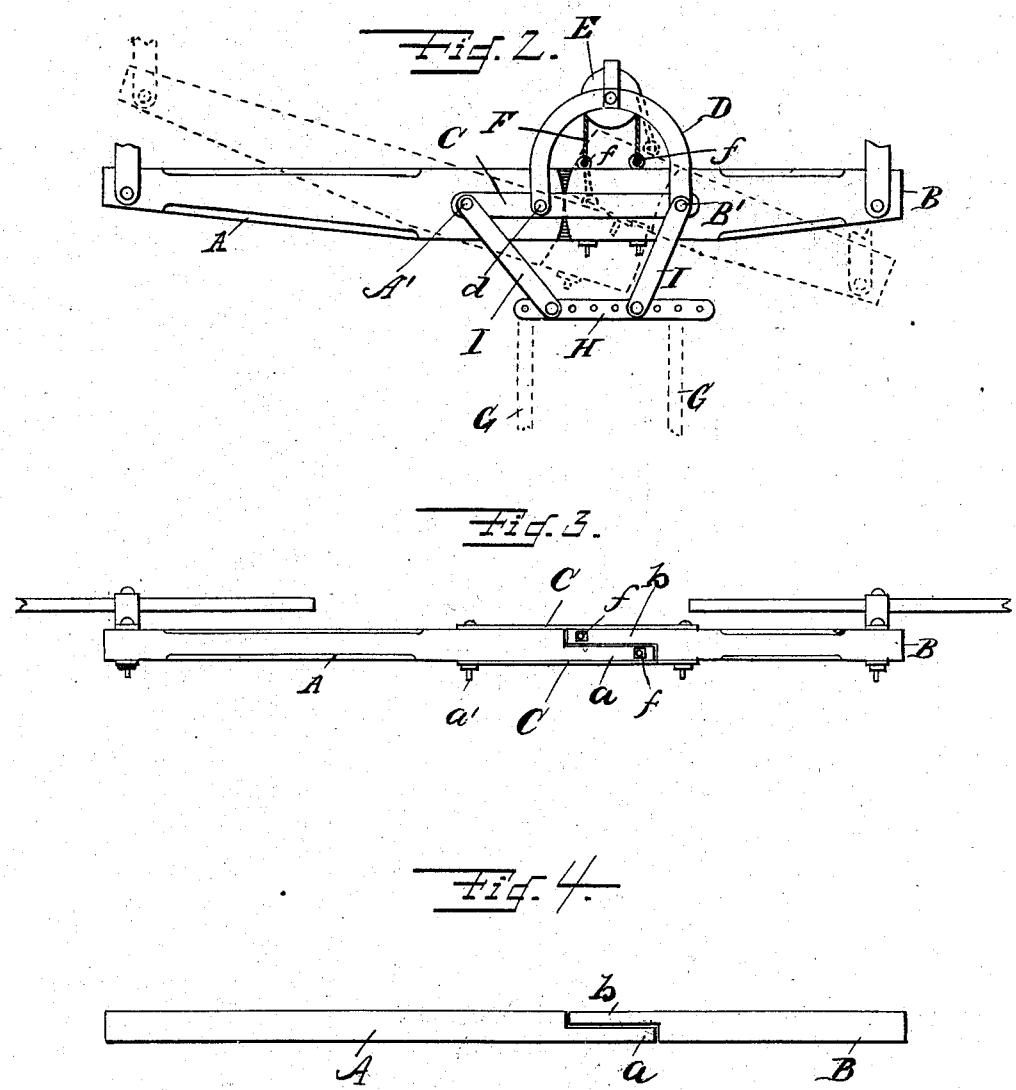

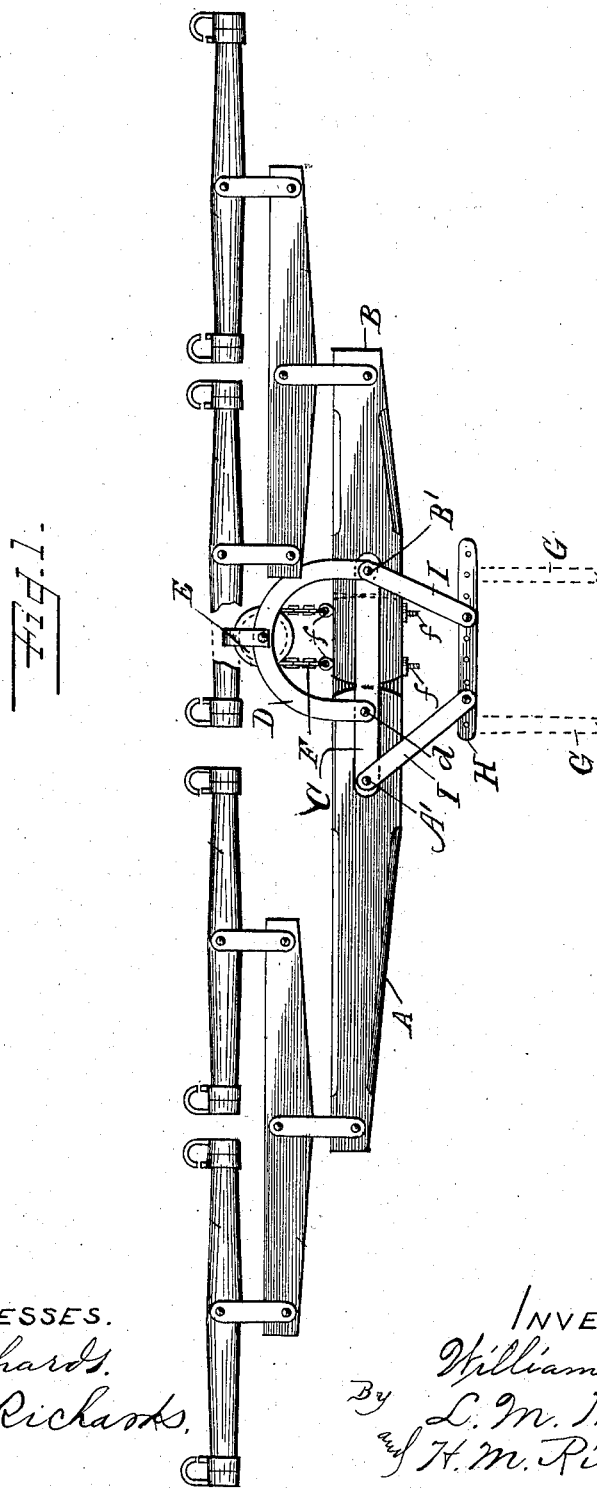

No. 757,288.

Patented April 12, 1904.

UNITED STATES PATENT OFFICE.

WILLIAM S. EMERT, OF PEORIA, ILLINOIS.

DRAFT-EQUALIZER.

SPECIFICATION forming part of Letters Patent No. 757,288, dated April 12, 1904.

Application filed February 6, 1904. Serial No. 192,441. (No model.)

*To all whom it may concern:*

Be it known that I, WILLIAM S. EMERT, a citizen of the United States, residing at Peoria, in the county of Peoria and State of Illinois, have invented certain new and useful Improvements in Draft-Equalizers, of which the following is a specification.

The object of the present invention, broadly stated, is to provide a draft-equalizer of improved construction to the end that inequality due to any cause whatever and tending to produce side draft on the plow, harvester, vehicle, or other machine or implement being drawn by a team of two or more horses will be avoided, the device being so constructed that the draft of one horse or team of horses reacts upon another. To this end I construct the equalizer of a pair of differential levers, and I so connect them that an excessive draft or strain upon one of them will be transmitted to and react upon the other.

The invention consists in the features of novelty that are hereinafter described with reference to the accompanying drawings, which are made a part hereof, and in which—

Figure 1 is a plan view of a draft-equalizer for a four-horse team embodying the invention. Fig. 2 is a plan view thereof with the double and swingle trees omitted. Fig. 3 is a rear elevation of portions thereof. Fig. 4 is a rear elevation of the differential levers.

As shown more clearly in Fig. 4, the differential levers are scarfed to provide overlapping portions *a* and *b*. The opposing shoulders resulting from this scarfing are rounded off in order to permit movement of the levers relatively to each other about centers at which bolts A' and B' pass through the levers A and B, respectively, and also through the perforated ends of a pair of plates or links C, which overlap the scarfed ends of the levers and constitute the means for holding them together in proper endwise relation to each other. As will be seen more clearly upon reference to Fig. 2, the levers are adapted to move about the centers A' and B' relatively to each other. In order to accomplish the objects of the invention, it is necessary to provide means whereby any movement of either of the levers about its center will cause a corresponding movement of the other lever about its center. For instance, upon reference to the dotted lines in Fig. 2 it will be seen that the horse or team hitched to the lever A has produced a stronger draft than the horse or team hitched to the lever B, but because of the connection hereinbefore and hereinafter described the draft of each horse or team is made to react upon the other. To this end a frame or yoke D is secured to the plates C, so that it projects forward of the forward side of the levers. In this yoke is journaled a pulley E, and around this pulley passes a rope, chain, or cable F, the ends of which are attached to the overlapping portions *a* and *b* of the levers A and B, respectively. Preferably this attachment is accomplished by means of eyebolts *f*, which pass completely through the overlapping ends of the levers, as shown more clearly in Figs. 1 and 2, nuts being turned onto their rear ends for preventing their withdrawal. The yoke D is preferably in the form of a semicircle, one end of which is secured in place by the bolt B', while the other end of which is secured to the plates C by bolts or rivets *d*, which do not pass through the lever A.

The invention is not concerned with the character of the machine, implement, or vehicle on which it is used; but in the drawings I have by dotted lines indicated a double plow-beam G, a clevis H, having a series of perforations, and a pair of links I, connecting the clevis with the bolts A' and B'.

By comparison of Figs. 1 and 2 it will be seen that the relations of the plow-beams, the clevis, the links I, the bolts C, and the frame D remain unchanged notwithstanding changes in the relative positions of the differential levers A and B, these changes in the levers being permitted by a give and take in opposite sides of the chain or other connection F.

What I claim as new, and desire to secure by Letters Patent, is—

1. A draft-equalizer having, in combination, a pair of differential levers overlapping at their ends, plates spanning the overlapping ends of the levers, pivots connecting the plates and levers so as to permit of their relative movement, a pulley, a frame or yoke supporting the pulley and a chain or the like passing over the pulley and having its ends connected to the overlapping ends of the differential levers, respectively, substantially as described.

2. In a draft-equalizer, the combination of a pair of differential levers having overlapping ends, plates spanning the overlapping ends of the levers, pivots connecting the plates and levers so as to permit of their relative movement, a yoke, a pulley supported by the yoke, a chain or the like extending over the pulley and having its ends secured to the overlapping ends of the levers respectively, and draft-links extending rearward from the plates, substantially as described.

3. In a draft-equalizer, the combination of a pair of differential levers having their ends scarfed and overlapped, plates spanning the overlapping ends of the levers, pivots connecting the plates and levers, a pulley, a chain or the like passing over the pulley and having its ends secured to the overlapping ends of the levers, respectively, means for supporting the pulley and means for transmitting the load to the levers, substantially as described.

WILLIAM S. EMERT.

Witnesses:
GEORGE A. YOUNG,
CLARENCE J. GRAHAM.